United States Patent
Wiart

[15] 3,639,819
[45] Feb. 1, 1972

[54] SWITCHER-CHOPPER FOR CONTROLLING CURRENT IN BRUSHLESS ROTATING MACHINES, SUPPLIED BY A DC SOURCE

[72] Inventor: Albert C. Wiart, Sannois, France

[73] Assignee: Jeumont-Schneider, Paris, France

[22] Filed: Nov. 28, 1969

[21] Appl. No.: 880,650

[30] Foreign Application Priority Data

Nov. 27, 1968 France...................................175549

[52] U.S. Cl............................................318/138, 318/254
[51] Int. Cl. .....................................................H02k 29/00
[58] Field of Search ..........................318/138, 227, 230, 254

[56] References Cited

UNITED STATES PATENTS

| | | | |
|---|---|---|---|
| 3,354,370 | 11/1967 | Corry et al............................ | 318/227 |
| 3,392,318 | 7/1968 | Huntzinger ......................... | 318/138 X |
| 3,474,320 | 10/1969 | Chandler ............................ | 318/227 X |
| 3,495,149 | 2/1970 | Swain ................................... | 318/138 |

Primary Examiner—Gene Z. Rubinson
Attorney—Raymond A. Robic

[57] ABSTRACT

A system for switching, reversing and varying the current flowing through the windings of a DC energized electrical machine, comprising: a two-winding smoothing reactor; two sets of supply thyristors connected by their anodes and cathode respectively to the machine terminals and to the two sides of a DC supply via one of the reactor windings; two sets of freewheeling thyristors connected like the supply thyristors to the machine terminals and interconnected to form two common points, one of which is taken to one end of the second reactor winding; and means for triggering chopping, switching and reversing operations with the use of at least one freewheeling or braking circuit.

11 Claims, 5 Drawing Figures

PATENTED FEB 1 1972

3,639,819

INVENTOR
Albert C. WIART

BY

ATTORNEY

INVENTOR
Albert C. WIART

INVENTOR
Albert C. WIART
BY
ATTORNEY

SWITCHER-CHOPPER FOR CONTROLLING CURRENT IN BRUSHLESS ROTATING MACHINES, SUPPLIED BY A DC SOURCE

This invention relates to an electronic system used mainly for switching, reversing and varying the current flowing through the windings of DC energized electrical machinery to provide, as required, speed and torque variations.

Basically, the underlying idea behind a system according to the invention is the same as for the applicants' U.S. Pat. application Ser. No. 869,289 of Oct. 24, 1969, but with the appreciable improvement that the invention is used in machinery in which periodic current reversal is required in the windings, the invention making it unnecessary to duplicate such windings.

According to the invention, any current-switching operation at the machine terminals is achieved through the use of supply thyristors appropriately interconnected to the machine windings (which may comprise one or more coils) and to one windings of a smoothing reactor. The control operation comprises blocking the supply thyristors of the energized winding before firing the supply thyristors which carry the switching current at the required terminals of the machine; consequently, the windings are isolated from the supply for a relatively brief period but the current in the previously energized windings remains at a substantially constant value, for during this brief isolation period the last-mentioned windings are automatically connected via auxiliary freewheeling thyristors across the other reactor winding, with the result that driving-torque pulsations are very limited.

The switching and reversing system which, as the previous paragraph shows, operates in the fashion of a chopper, enables the mean value of current taken to be adjusted by modification of the ratio between dead and live times of the windings.

The switching and reversing method briefly outlined in the foregoing can be triggered by means of a capacitor connected, in parallel with a diode, in the common freewheeling thyristor circuit and charged regularly to a voltage above the supply voltage, so that if the polarities of the various elements are arranged appropriately relatively to one another, when the freewheeling thyristors for the particular winding to be deenergized are fired the capacitor discharges through the last-mentioned thyristors, to the associated switching (supply) thyristors; once the capacitor has discharged, the current which flows through the winding and which is maintained by the smoothing reactor flows through the diode and the freewheeling effect comes into full operation, disappearing of course after the firing of the next supply thyristors.

When the system according to the invention is used for a synchronous machine, capacitor discharge is triggered by known means through the agency of a detector sensing the position of the moving part of the motor; for torque or speed variation, the triggering is by control signals processed to vary the ratio between the conductive times of the supply thyristors and the conductive times of the freewheeling thyristors. These signals can be synchronized on the chopping time base with the signals initiated by the position detector.

When the system according to the invention is used for an asynchronous machine, output signals at a frequency substantially proportional to the set speed are used to discharge the capacitor to trigger switching operations in the motor as also disclosed in the above-identified application.

Another advantage of the system according to the invention is that it can readily provide either rheostatic or regenerative braking of the motor.

To achieve the various aims hereinbefore set forth, the switching and chopping facility according to this invention mainly comprises: an interleaved two-winding smoothing reactor two sets of supply thyristors connected by their anodes and cathodes respectively to the machine terminals and to the two sides of the DC supply via one of the reactor windings; two sets of freewheeling thyristors connected like the supply thyristors to the machine terminals and interconnected to form two common points, one of which is taken to one end of the second reactor winding; and means for triggering chopping, switching and reversing operations with the use of at least one freewheeling or braking circuit.

According to another feature of the invention, instead of a two-winding reactor, a reactor is used having windings connected to the machine terminals, to the supply thyristors on the positive or negative side of the DC supply, and to the corresponding freewheeling thyristors.

For a better understanding of the features and operation of the system according to the invention, a more detailed description will now be given of some embodiments, reference being made to the accompanying diagrammatic drawings wherein.

Figure 1:
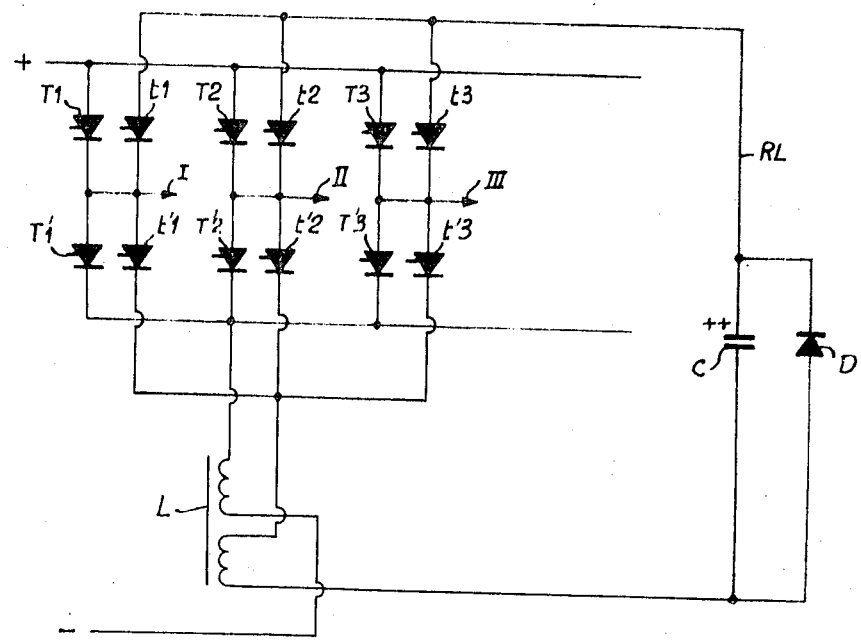
FIG. 1 shows a circuit arrangement for a three-terminal machine controlled by an extinguishing capacitor.

Referring to FIG. 1, supply thyristors $T_1$ to $T_3$ and $T'_1$ to $T'_3$, freewheeling thyristors $t_1$ to $t_3$, and $t'_1$ $t'_3$, a reactor L having two windings, a freewheeling line RL and capacitor C are all interconnected as shown. The machine has terminals symbolized by references I, II, III.

The system is triggered by the agency of a capacitor C which is charged regularly by any known means to a voltage above the supply voltage, for instance, to twice the supply voltage if charging is effected from the supply by means of an oscillating circuit having the capacitor C as one of its integers. Let us assume that thyristors $T_1$ and $T'_3$ are conductive. If, under these conditions, the thyristors $t_1$, $t'_3$ are fired, capacitor C discharges so that thyristors $T_1$, $T'_3$ become nonconductive. When the capacitor C has discharged current continues to flow through the freewheeling line RL by way of a diode D shunted across capacitor C. The motor is reenergized, by the triggering of the required supply thyristors so that, of course, the previously fired freewheeling thyristors become nonconductive.

If leakages between the two windings of reactor L are reduced, switching in the reactor L can be performed readily; the difference between the supply circuit voltage and the freewheeling circuit voltage (the latter voltage being zero) ensures satisfactory switching of the motor windings.

Figure 2:
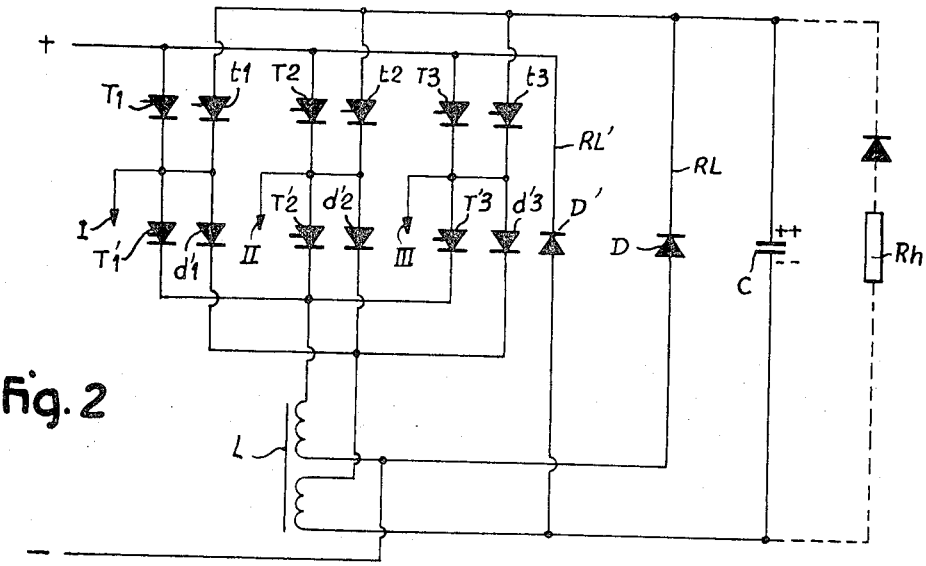
FIG. 2 shows a circuit arrangement similar to FIG. 1 but adapted to provide braking.

The circuit arrangement shown in FIG. 2 differs from the circuit arrangement shown in FIG. 1 in that the diode shunting the capacitor C is omitted and two diodes D, D' are provided and are connected as shown to form freewheeling circuits using lines RL, RL'; if required, the thyristors $t'_1$ to $t'_3$ can be replaced by diodes $d'_1$ t $d'_3$. As in the previous embodiment, to block the supply thyristors the capacitor C, having previously been charged up to a voltage higher than the supply voltage, discharges. For instance, if $T_1$, $T'_3$ were conductive they become nonconductive by triggering $t_1$—i.e., by the cathode of $T_1$ being brought to the potential on the positive side of capacitor C. Current then flows via $t_1$, $d'_3$, the bottom (in the drawing) winding of reactor L and initially via capacitor C and subsequently, after discharge thereof, via the diodes D, D'; in this final phase the system regenerates to the supply. If, in this situation, the thyristor $T'_3$ is triggered again, the system freewheels via D, $t_1$ and $t'_3$. To switch the terminals of a regenerating or freewheeling machine, all that needs to be done is to fire the thyristors, for instance, $T_2$ and $T'_3$, corresponding to the terminals to be energized. If a rheostat $Rh$ is connected as indicated by dashlines, the arrangement shown in FIG. 2 can provide rheostatic braking.

For correct operation of all the embodiments hereinbefore described, two supply thyristors, e.g., $T_1$ and $T'_3$, must become nonconductive simultaneously. In the circuit arrangement shown in FIG. 3 commutating and a changeover to freewheeling operation can be performed by just one of such thyristors becoming nonconductive. Accordingly, there are two freewheeling circuits RL, RL' each comprising a respective capacitor C, C' and associated oscillating circuit charging facility under the control of thyristors T, T' in series with reactors 1, 1' a respective diode D, d' shunting the capacitors C, c'. Assuming that the motor is being energized via thyristors $T_1$ and $T'_3$, a changeover to freewheeling operation can be made using either of the two freewheeling circuits. For instance, if capacitor C has been charged to twice the supply voltage, then when $t_1$ fires, capacitor C discharges to render $T_1$ nonconductive, so that the system freewheels by way of $t_1$, the motor $T'_3$, the reactor L and the diode D. When the two capacitors C, C' discharge the one via $t'_3$ and the other via $t_1$, the two thyristors $T'_3$, $T_1$ fire, the two freewheeling circuits are cut in and the system regenerates via the circuit extending from the negative side of the supply, the diode D, the thyristor $t_1$, the motor, the thyristor $t'_3$, the reactor L and the diode D' to the positive side of the supply. Commutating operations can be performed by firing of the appropriate supply thyristors, changing over from freewheeling operation to operation on the supply or to freewheeling regeneration or to regeneration to the supply. If an extra thyristor is provided between points $a$ and $b$, diodes can be used instead of the thyristors $t'_1$, $t'_2$, $t'_3$ in FIG. 3. Rheostatic braking can also be provided if a rheostat $Rh$ is connected as indicated by dashlines in FIG. 3.

Figure 3:
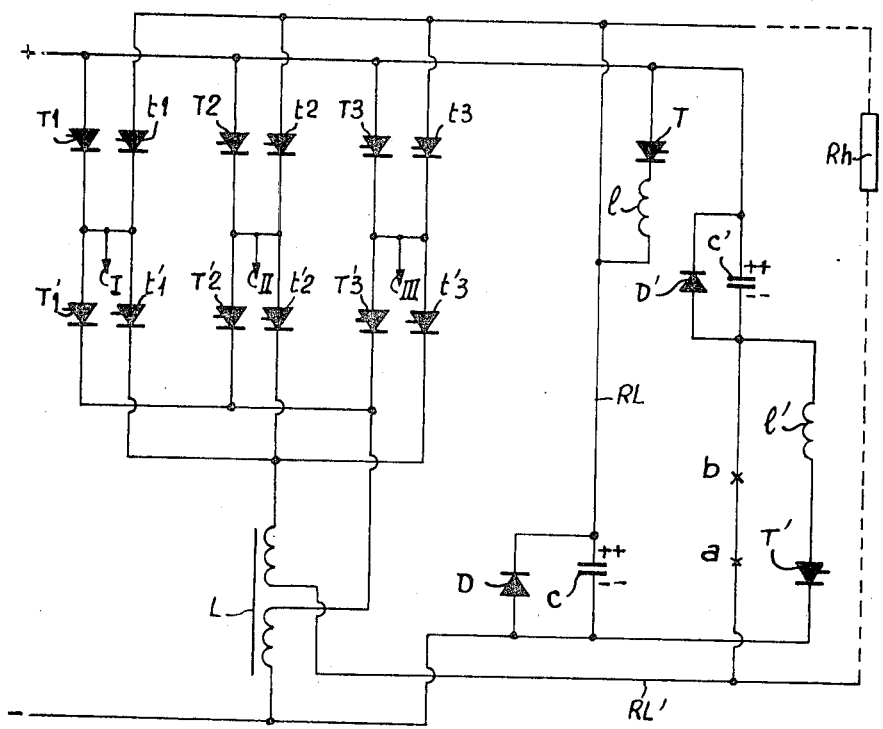
FIG. 3 shows a variant of FIG. 2.
Figure 4:
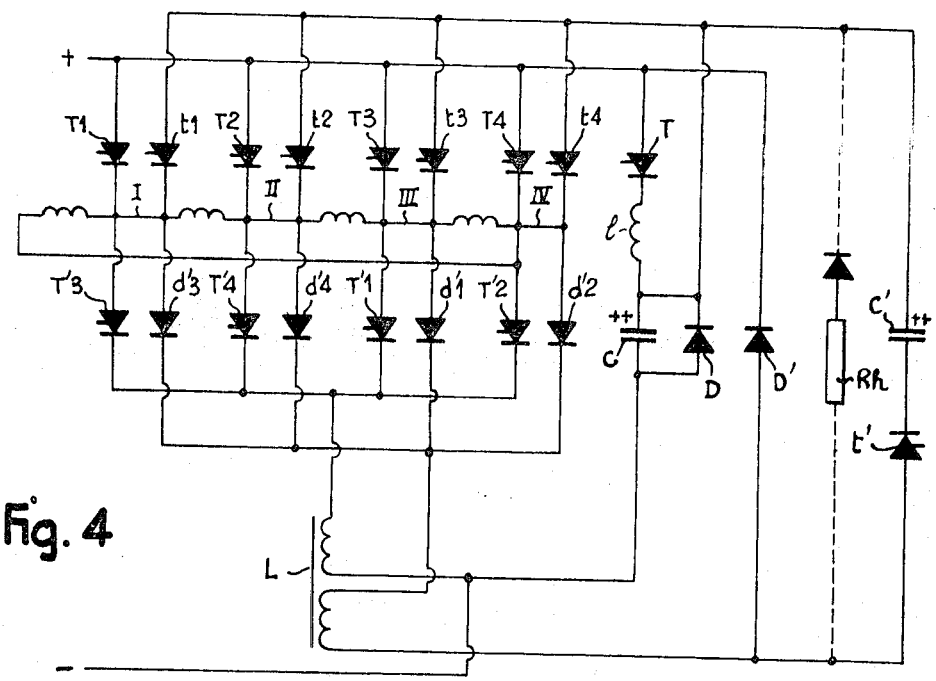
FIG. 4 shows an embodiment somewhere between the embodiments shown in FIGS. 2 and 3.

FIg. 4 shows a circuit arrangement which is derived from the circuit arrangements shown in FIGS. 2 and 3 and which is for a four-winding motor connected to terminals I, II, III, IV, with simultaneous commutation of corresponding thyristors on the positive and negative side of the DC supply. If the motor is being energized via thyristors $T_1$, $T'_1$, thyristor $T_1$ is blocked by thyristor $t_1$ firing, with the result that capacitor C, which has previously charged up to above the supply voltage, discharges. The motor current, maintained by reactor L, then flows via the freewheeling circuit formed by the diode D and the thyristors $t_1$, $T'_1$. To change over to regeneration, capacitor C' is discharged by the firing of $T_1$ and a thyristor $t'$, *the latter being connected in series with C' and the second winding of reactor L, between the common point of the freewheeling thyristors $t_1$ to $t_4$ and to common point of the diodes $d'_1$ to $d'_4$.* Capacitor C' has also been charged to above the supply voltage and discharges to block $T'_1$ (and $T_1$ too if the latter was not already in the blocked state); there is then regeneration to the supply via diodes D and D'. The system can be switched from regenerative operation by the appropriate supply thyristors being refired.

Figure 5:
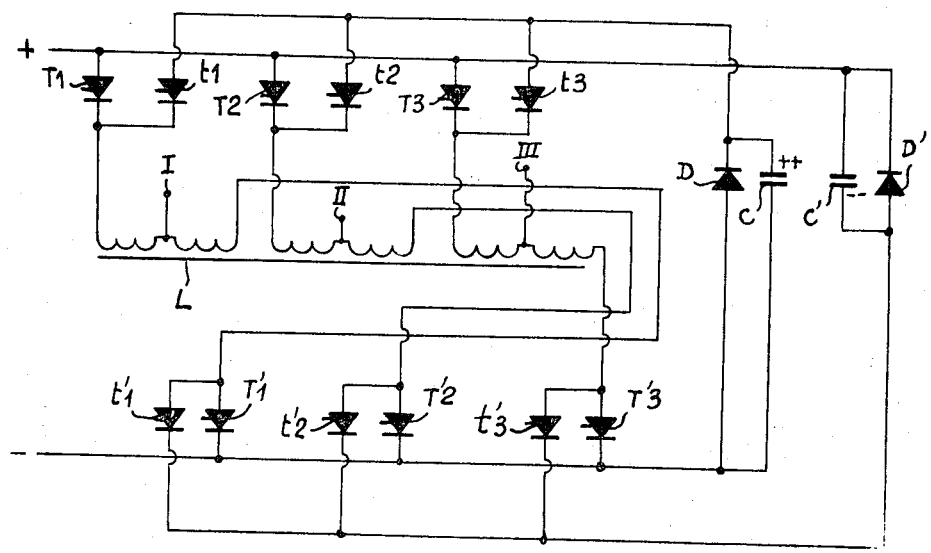
FIG. 5 shows a circuit arrangement differing from the circuit arrangements shown in the previous drawings inter alia because it uses a reactor having a number of windings corresponding to the number of terminals of the motor.

In the systems shown in FIGS. 1-4, the reactor L has two windings, one of which is used for normal supply energization and the other of which is used for freewheeling regeneration. FIG. 5 shows a circuit arrangement having a reactor L comprising windings to the same number as the motor has terminals 1—3 in the particular case. The motor terminals I, II, III, are connected to the windings of reactor L whose ends are connected the ones to the commutating and freewheeling thyristors on the positive side of DC supply and the others to the commutating and freewheeling thyristors on the negative side of DC supply. Nevertheless, as the reader can readily gather, the system shown in FIG. 5 operates just like the system shown in FIG. 3.

In general the various embodiments described with reference to FIGS. 1-5, are given only as examples, and so circuit arrangements deriving from the circuit arrangements described by a single or multiple combination of their elements shall be considered to fall under this invention.

The invention is also of use for systems comprising not thyristors but transistors or any other current-routing means, in which event, if the corresponding elements have adequate rupturing capacity, the circuit arrangements can be simplified by the omission of the or each thyristor-extinction capacitor.

I claim:

1. A system for switching, reversing and varying the current flowing through the machine terminals and the machine windings of a direct current electrical machine, comprising:

an interleaved two-winding smoothing reactor;
a direct current supply having two supply terminals;
two sets of supply thyristors; a first set of said supply thyristors connected between one of said supply terminals and said machine terminals; the second set of said supply thyristors connected between said machine terminals and the other of said supply terminals through one winding of said reactor;
at least one freewheeling connecting line;
two sets of freewheeling thyristors; a first set of said freewheeling thyristors connected between one of said freewheeling lines and said machine terminals and oriented in the same direction as said first set of supply thyristors; the second set of said freewheeling thyristors oriented in the same direction as said second set of supply thyristors and connected between said machine terminals and one of said freewheeling lines through the other of said reactor windings; whereby a freewheeling circuit is formed including at least one thyristor of one of said sets of freewheeling thyristors, said second winding of said reactor, at least one of said freewheeling lines, and at least one of said machine windings.

2. A system for switching, reversing, and varying the current flowing through the machine terminals and the machine windings of a direct current electrical machine, comprising:

a multiwinding smoothing reactor with interleaved windings each of said interleaved windings having two end terminals and an output terminal, said output terminal connected to one of said machine terminals;
a direct current supply having two supply terminals;
two sets of supply thyristors, a first set of said supply thyristors connected between one of said supply terminals and one of said end terminals of said interleaved windings, the second set of said supply thyristors connected between the other if said supply terminals and the other of said end terminals of said interleaved windings;
at least one free wheeling connecting line;
two sets of freewheeling thyristors, a first set of said freewheeling thyristors connected between one of said freewheeling lines and one of said end terminals of said interleaved windings and oriented in the same direction as said first set of supply thyristors, the second set of said freewheeling thyristors connected between one of said freewheeling lines and the other of said end terminals of said interleaved windings and oriented in the same direction as said second set of supply thyristors; whereby a freewheeling circuit is formed including at least one thyristor of one of said sets of freewheeling thyristors, at least one of said interleaved windings, at least one of said freewheeling lines, and at least one of said machine windings.

3. A system as set forth in claim 1, comprising, for triggering switching and chopping operations, a contactor connected in the supply, the freewheeling circuit being closed on itself.

4. A system as set forth in claim 1, wherein a capacitor shunted by a diode is connected in said freewheeling circuit and is normally charged to a voltage higher than the supply voltage and is discharged by the firing of the freewheeling thyristor corresponding to the supply thyristor in operation, to trigger said a switching and chopping operations.

5. A system, as set forth in claim 1, wherein a capacitor is connected into said freewheeling circuit, a diode is connected between one of said supply terminals and one side of said capacitor, and a second diode is connected between the other of said supply terminals and the other side of said capacitor.

6. A system as set forth in claim 5, comprising in parallel with the capacitor a rheostat in series with a diode for producing rheostatic braking.

7. A system as set forth in claim 5, wherein diodes are used instead of the freewheeling thyristors of one of said sets of freewheeling thyristors.

8. A system as set forth in claim 1 wherein said freewheeling circuit includes two capacitors, each shunting by a diode, the first of said capacitors connected in one of said freewheeling lines which connect the first of said supply terminals to the second set of said freewheeling thyristors through the other of said reactor windings, the second of said capacitors connected in another of said freewheeling lines which connects the first sets of said freewheeling thyristors to the second supply terminal.

9. A system as set forth in claim 2 wherein said freewheeling circuit includes two capacitors, each shunted by a diode, the first of said capacitors connected in one of said freewheeling lines which connects the first set of said freewheeling thyristors to the second of said supply terminals, the second of said capacitors connected in another of said freewheeling lines which connects the second set of said freewheeling thyristors to the first of said supply terminals.

10. A system as set forth in claim 8, wherein said freewheeling circuit is closed by way of a rheostat to produce rheostatic braking.

11. A system as set forth in claim 9, wherein diodes are used instead of the freewheeling thyristors of one of the sets and a thyristor is connected in series with the resulting set of diodes.

* * * * *